Sept. 8, 1953  J. W. CARTER  2,651,272
BAG CLOSING AND DELIVERY UNIT
Filed July 31, 1947  8 Sheets-Sheet 2
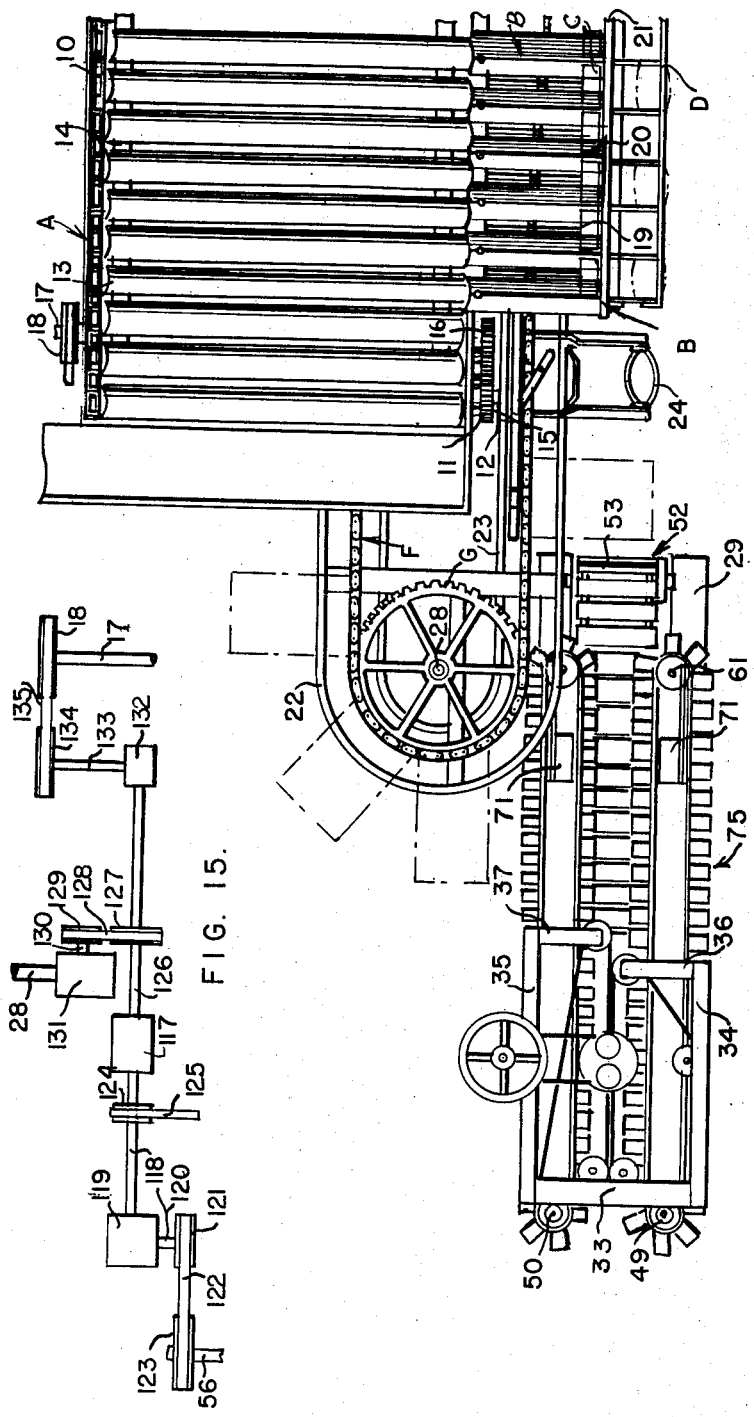
Inventor
Jack W. Carter
By
Shreve, Crow & Gordon
Attorneys

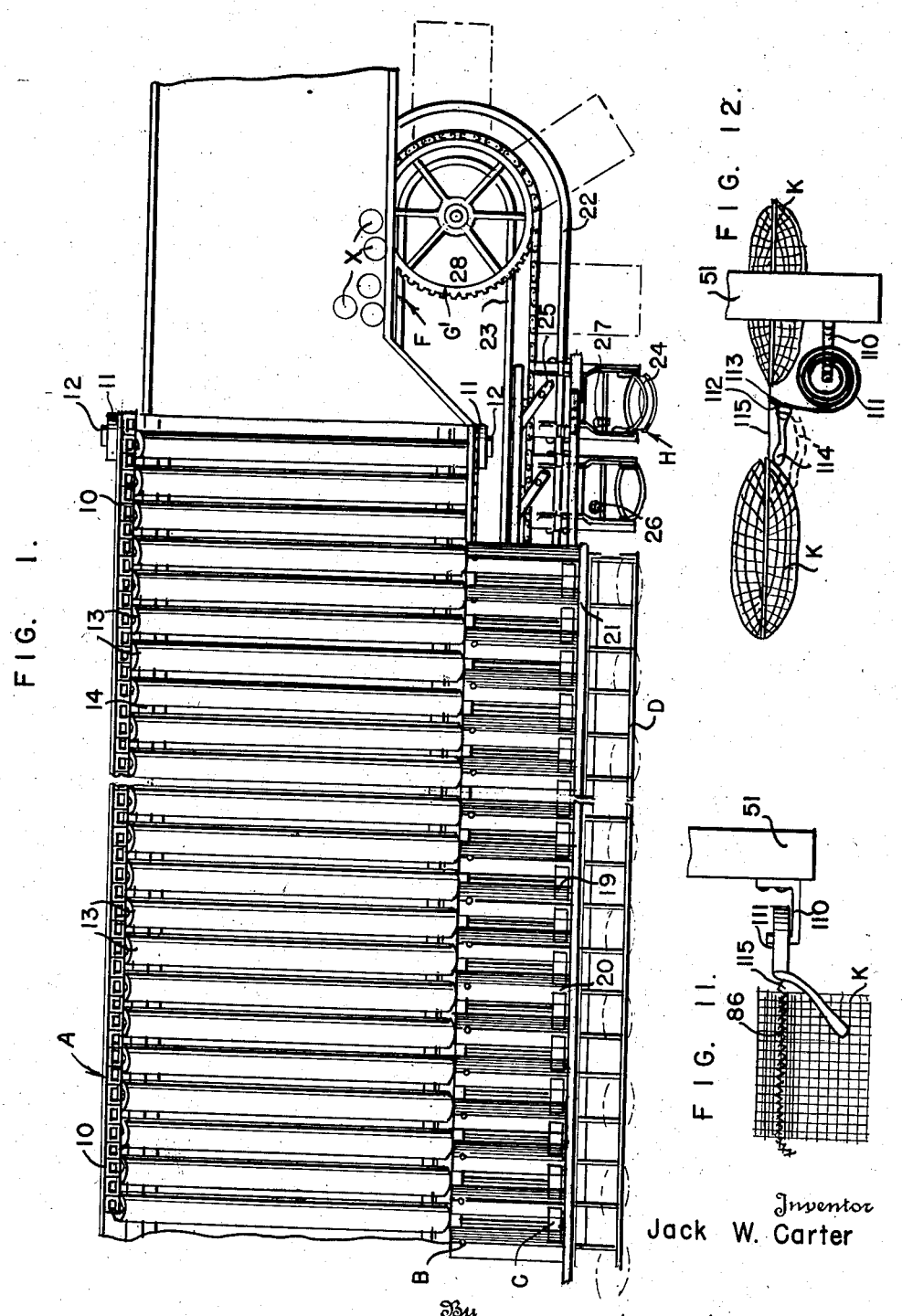

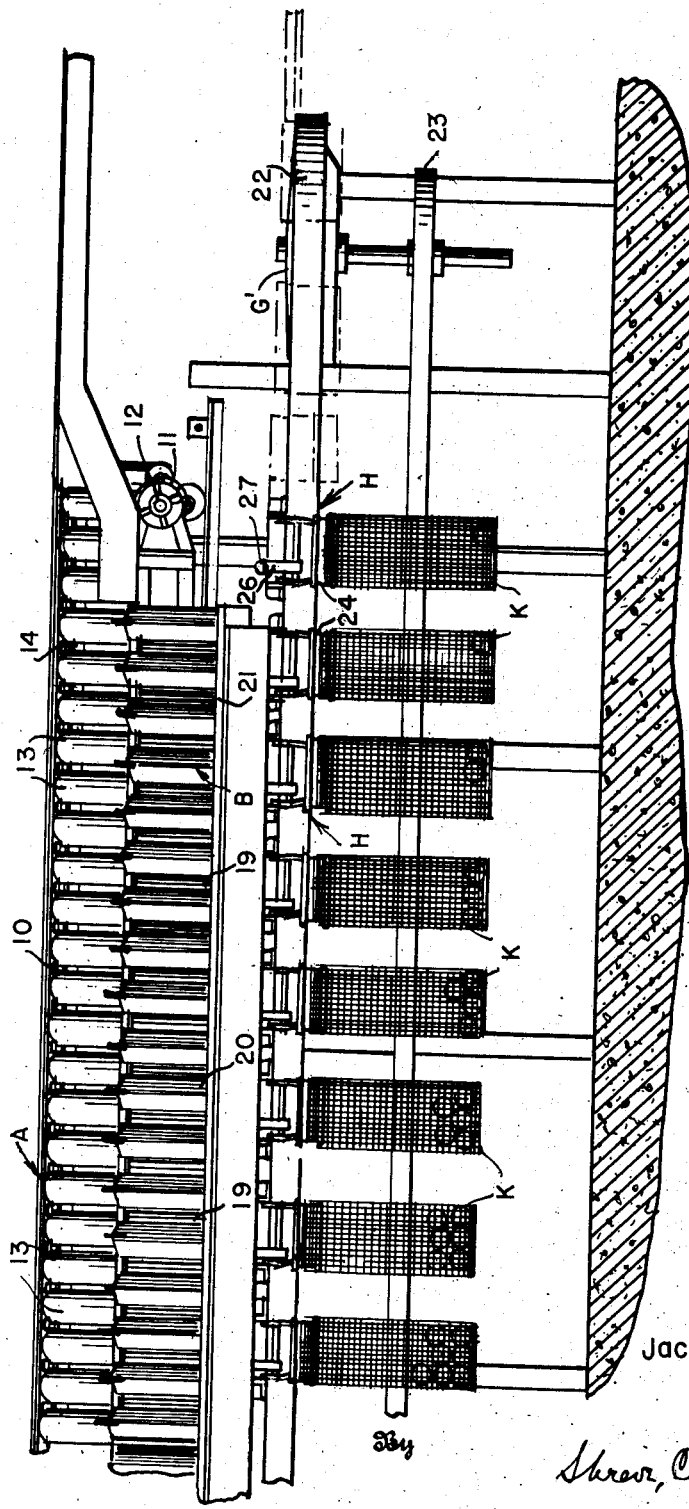

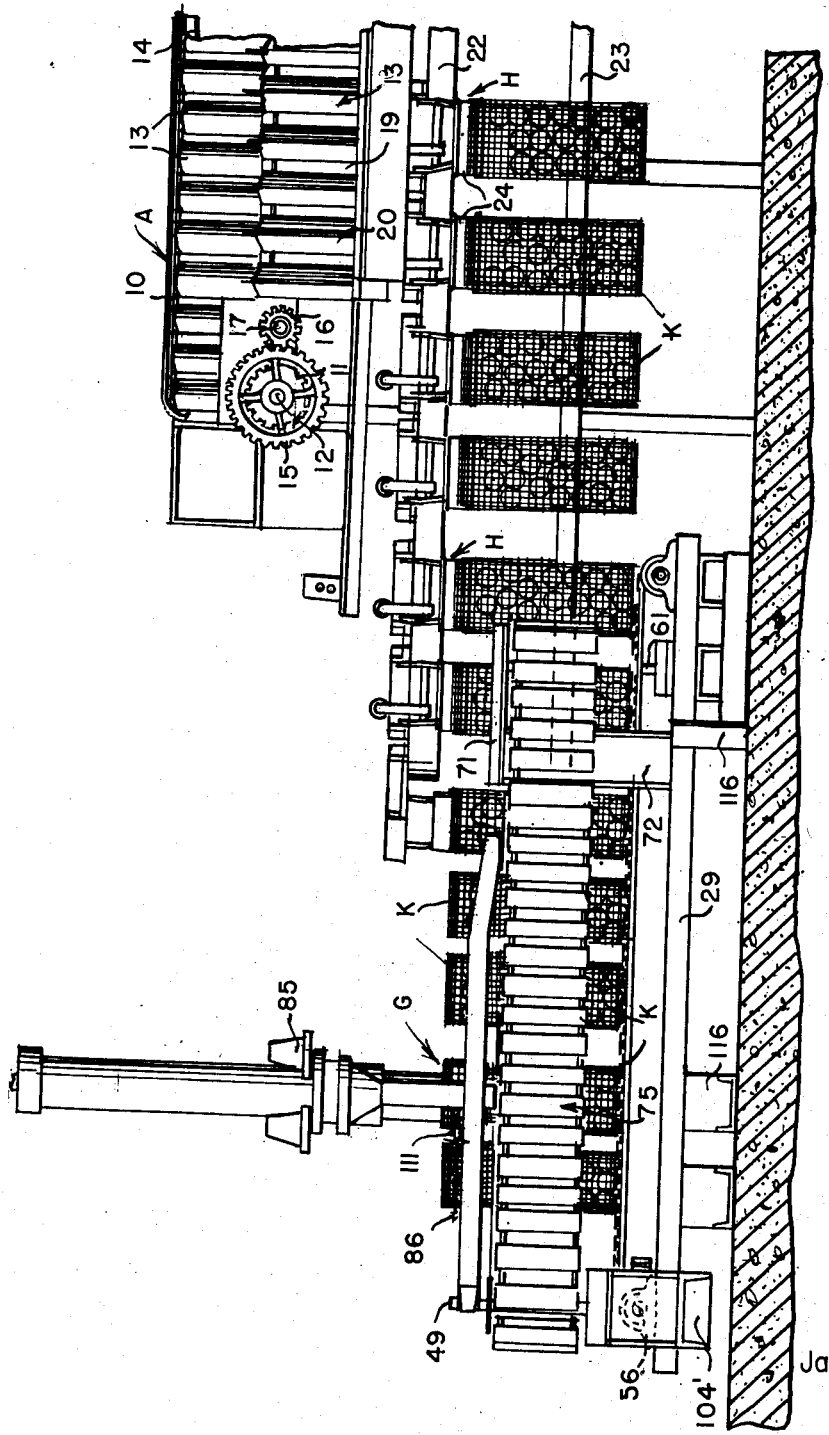

Sept. 8, 1953
J. W. CARTER
2,651,272
BAG CLOSING AND DELIVERY UNIT
Filed July 31, 1947
8 Sheets-Sheet 5
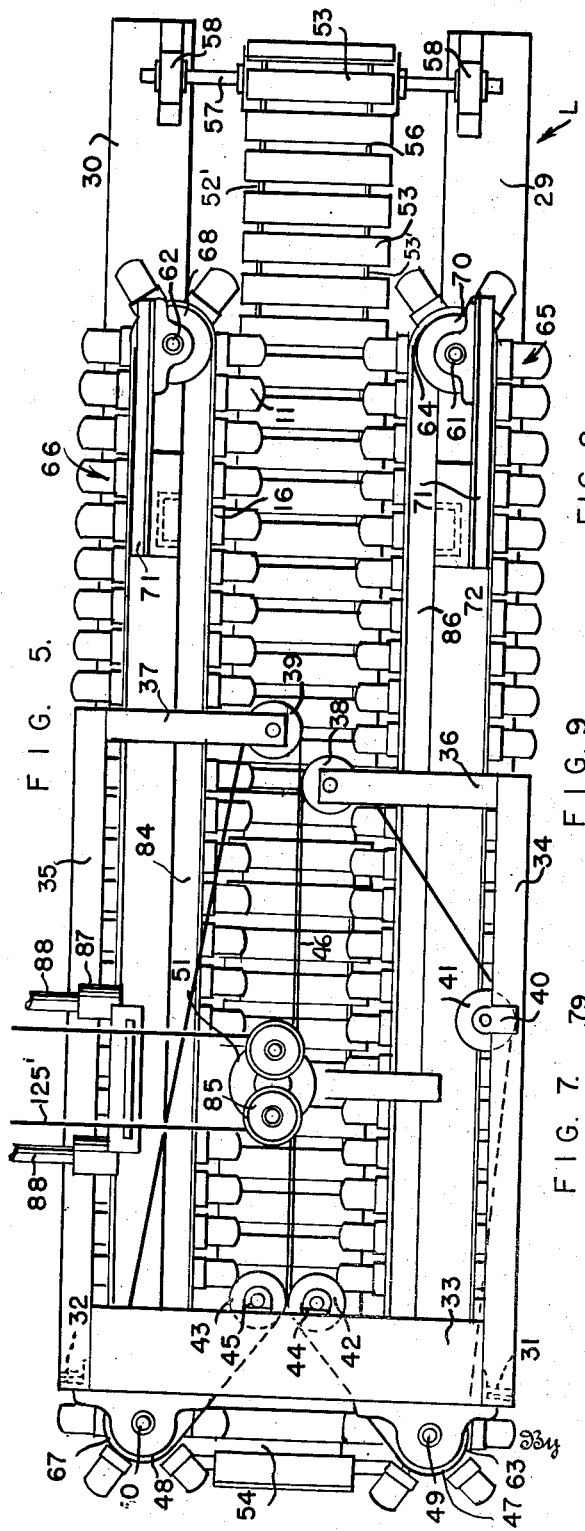
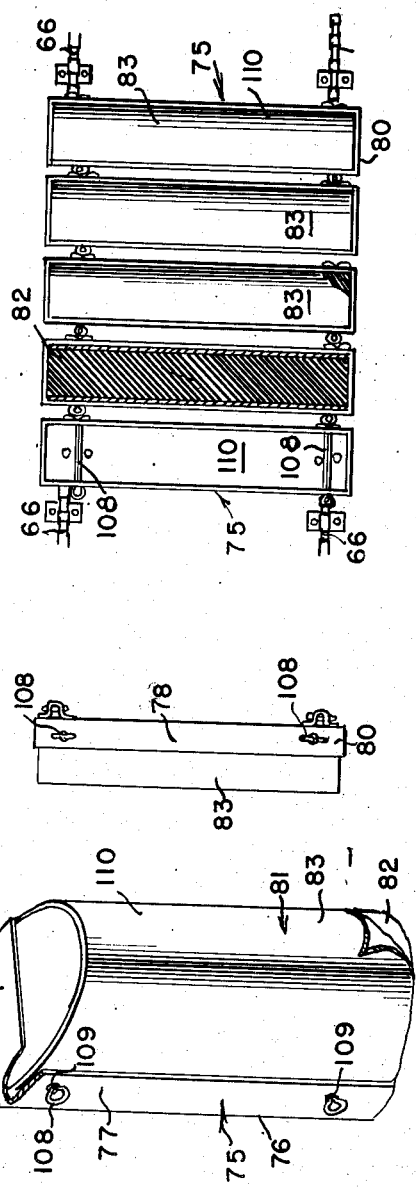
Inventor
Jack W. Carter
Attorneys

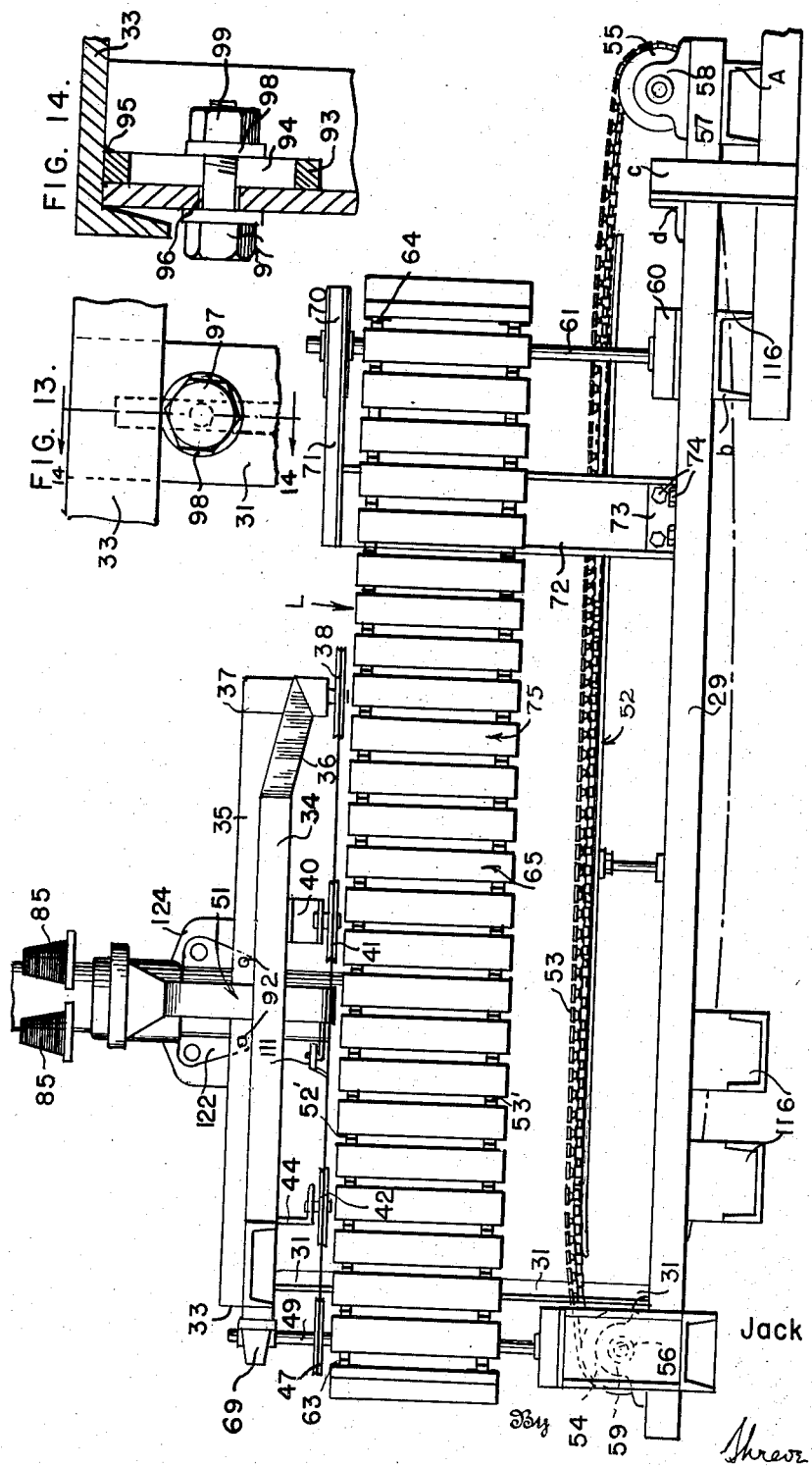

Sept. 8, 1953 J. W. CARTER 2,651,272
BAG CLOSING AND DELIVERY UNIT
Filed July 31, 1947 8 Sheets-Sheet 8

Inventor
Jack W Carter
By
Attorneys

Patented Sept. 8, 1953

2,651,272

UNITED STATES PATENT OFFICE 2,651,272

BAG CLOSING AND DELIVERY UNIT

Jack W. Carter, Winter Haven, Fla., assignor to Fulton Bag & Cotton Mills, Atlanta, Ga., a corporation of Georgia Application July 31, 1947, Serial No. 765,137

8 Claims. (Cl. 112—11)

The present invention relates to a machine for packaging citrus fruits and similar articles, the fruit being packed in bags in a predetermined number or weight in each bag.

The demand of the trade in citrus fruits and similar articles make the use of mesh bags very popular as receptacles for the fruit, as the contents of such mesh bags can be viewed by purchasers or prospective purchasers without requiring opening of the container for inspection of the contents of the bags. In the use of such bags, it is customary to introduce, for marketing, a predetermined number or weight of the fruit or other commodity to be offered for sale.

Various mechanisms have been developed for packaging articles of this kind, and in order to retain the fruit in the bags during shipment and sale on the market, it is necessary that the bags be securely closed. In view of the fact that the bags are made of material that can be sewed readily it is convenient to close the bags with one or more lines of stitching across the mouth of the bags.

Generically this invention relates to distributing and packaging machines, but it is more particularly directed to an apparatus for packaging citrus fruits, vegetables, or other objects of a spherical nature, and including instrumentalities for distributing and feeding such spherical objects, bag holding means, and filled bag closing and delivery means.

A principal object of this invention is the provision of a fruit packaging mechanism of this character embracing what may be termed three main divisions or units, namely, a distributing and feeding mechanism, a bag holding carriage and track assembly and a filled bag closing and delivery unit, adapted to distribute and deliver a predetermined number of the objects to be packaged to each bag in the course of its travel through the machine.

Another important object of this invention is a fruit distributing conveyor adapted to effect rotation of the fruit being distributed and to gravitationally deliver it sidewise therefrom to a plurality of chutes angularly disposed with respect to said conveyor, the number of chutes corresponding to the number of objects to be contained in the filled bags, an endless conveyor and bag carrying jaw assembly adapted to effect travel of the respective bags beneath the discharge end of said chutes, and means for effecting the delivery of an object from each of the chutes successively to the respective bags during their travel thereunder, and a bag delivery unit adapted to receive the filled bags from the holders and effect their closure by passing them through a sewing unit.

The subject matter comprehended by the distributing and feeding mechanism is more specifically described and claimed in my co-pending application, Serial No. 765,135, filed July 31, 1947, now Patent No. 2,625,255, dated January 13, 1953, and the subject matter of the bag holders, carriage, and track assembly is more specifically described and claimed in my co-pending application Serial No. 765,136, filed July 31, 1947.

More particularly the subject matter of this application relates to the filled bag closure and delivery apparatus comprising the conveyor means including the resilient means for grippingly engaging opposite sides of the filled bags, the bag mouth holding and guiding means, bag sewing means, and the sewed bag thread chain cutting mechanism.

One of the principal objects of this invention is the provision of conveyor means for receiving the filled bags from the filling mechanism and cooperating conveyor means for gripping the opposite sides of the bags for conveying them in alignment without damage to the fruit contents, and at the same time preventing shifting of said contents by the gripping operation for delivery through a sewing mechanism for closing the bags.

Another important object of this invention is the provision of a trio of synchronized endless conveyors, two of which are vertically mounted, and comprise upper and lower endless chains having mounted thereon an endless series of rigid strip-like members provided on their surfaces with resilient sponge-rubber or he like gripping elements adapted to grip opposite sides of the bags throughout their length, and substantially that of the bag, so as not to damage the fruit and at the same time prevent substantial shifting of the fruit by reason of its spherical nature so as to afford a substantial gripping area with respect to the bag.

Another important object of this invention is the provision of slat box-like vertical conveyor elements so constructed as to receive and supportingly engage the ends and sides of the resilient or rubber-like elements to maintain them in position and prevent their undue distortion and disalignment under operating conditions, and means for detachably securing said elements therein, whereby, their ready removal and replacement may be effected.

Another important object of this invention is the provision of means for gripping the open ends of the bags and directing them in a straight line to and through the sewing head, said means being vertically adjustable with the sewing head to position the same with respect to different sized bags.

As the sewed bags are delivered from the sewing head they are connected by a line of thread, therefore, in order to sever the thread, it is necessary to provide a thread-cutting mechanism, and therefore another important object of this invention is the provision of a spring-mounted sewed bag controlled cutter mounted on the sewing head, including a cutter blade and operating handle means adapted to be depressingly engaged by the sewed portion of each bag as it passes from the machine, whereby cutting of the thread is automatically effected by disengagement of said operating handle from the bag.

Another important object of this invention is the provision of a driving arrangement whereby the various conveyor units and bag mouth grippingly guiding mechanism are driven from a single driving connection.

With these and other objects in view, which will become apparent as the description proceeds, the invention resides in the construction, combination, and arrangement of parts, hereinafter more fully described and claimed, and illustrated in the accompanying drawings, in which like characters of reference indicate like parts throughout the several figures, of which:

Fig. 1 represents a fragmentary plan view of the loading end of a bag filling machine, the view showing a series of bag holders arranged to receive the bags to which the predetermined number or weight of the fruit is to be placed.

Fig. 2 is a plan view of the discharge end of the bag filling portion of the machine shown in Fig. 1, and the view showing also, in plan, the improved filled bag closing and delivery unit.

Fig. 3 is a side elevation of the end of the machine shown in Fig. 1, but indicating the bags in position on the holders for receiving the fruit from a loading mechanism.

Fig. 4 is a side elevation of the remaining portion of the machine shown in Fig. 3, the view showing also in side elevation, the bag closing and delivery unit, the view indicating the manner in which the filled bags are transported from the filling unit to the sewing unit.

Fig. 5 is a plan view of the bag closing and delivery unit.

Fig. 6 is a side elevation thereof.

Fig. 7 is a perspective view of one of the gripping elements for the filled bags.

Fig. 8 is a detailed fragmentary side elevation of one of the side conveyors of the unit, incorporating the bag-gripping means of Fig. 7, the view showing one of the elements of the conveyor in vertical section.

Fig. 9 is a side elevation of the gripper member illustrated in Fig. 7.

Fig. 11 is a side view of means employed for severing the thread after closing the bags, and a portion of the sewing head.

Fig. 12 is a plan view of Fig. 11 showing further details of the operation of the thread cutting means.

Fig. 13 is a fragmentary elevation of a part of the mechanism provided for enabling vertical adjustment of the sewing machine.

Fig. 14 is a vertical sectional view taken on line 14—14 of Fig. 13 looking in the direction of the arrows.

Fig. 15 is a diagrammatic view of the driving mechanism for the machine.

Figure 10:
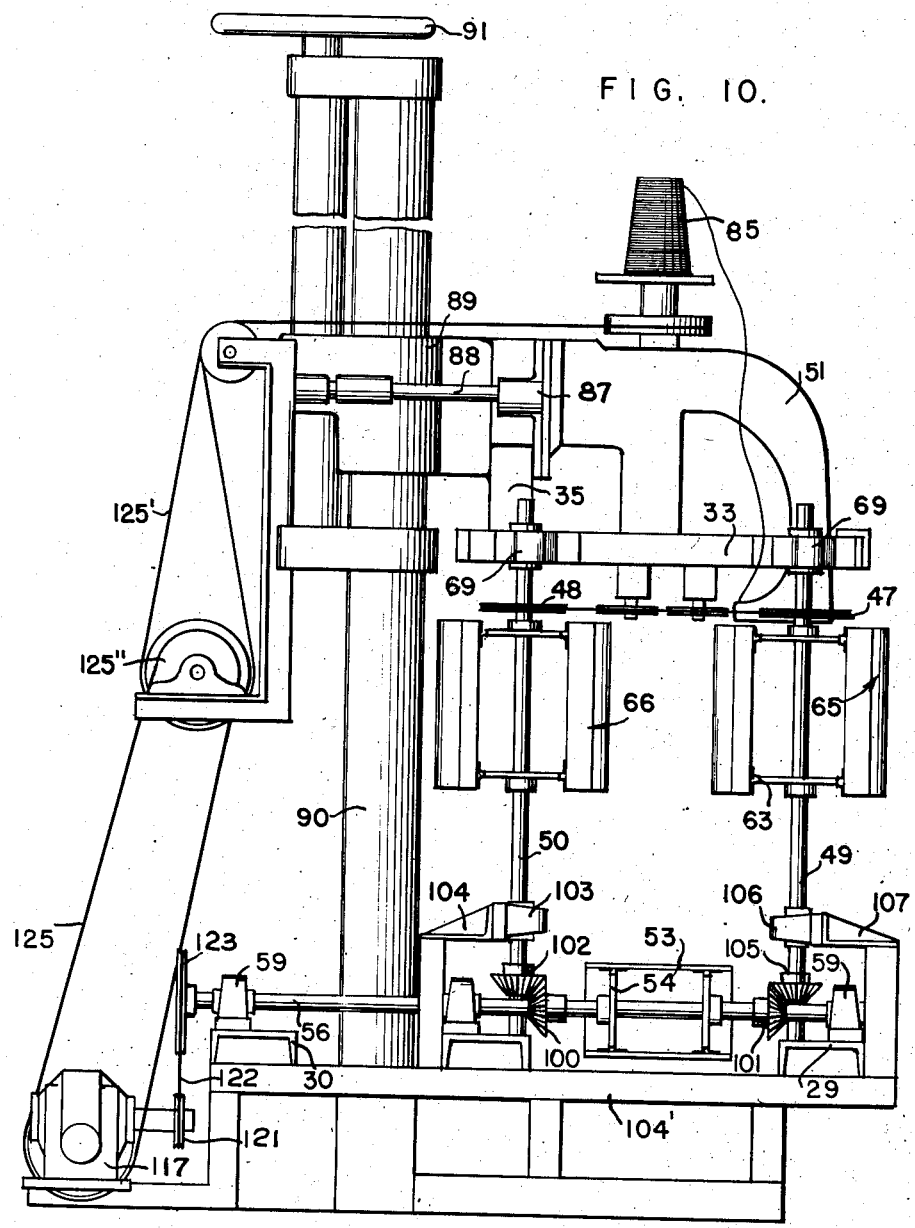
Fig. 10 is a rear end elevation of the machine, showing various drive means and power-transmitting instrumentalities employed for the operation of the machine.
Figure 16:
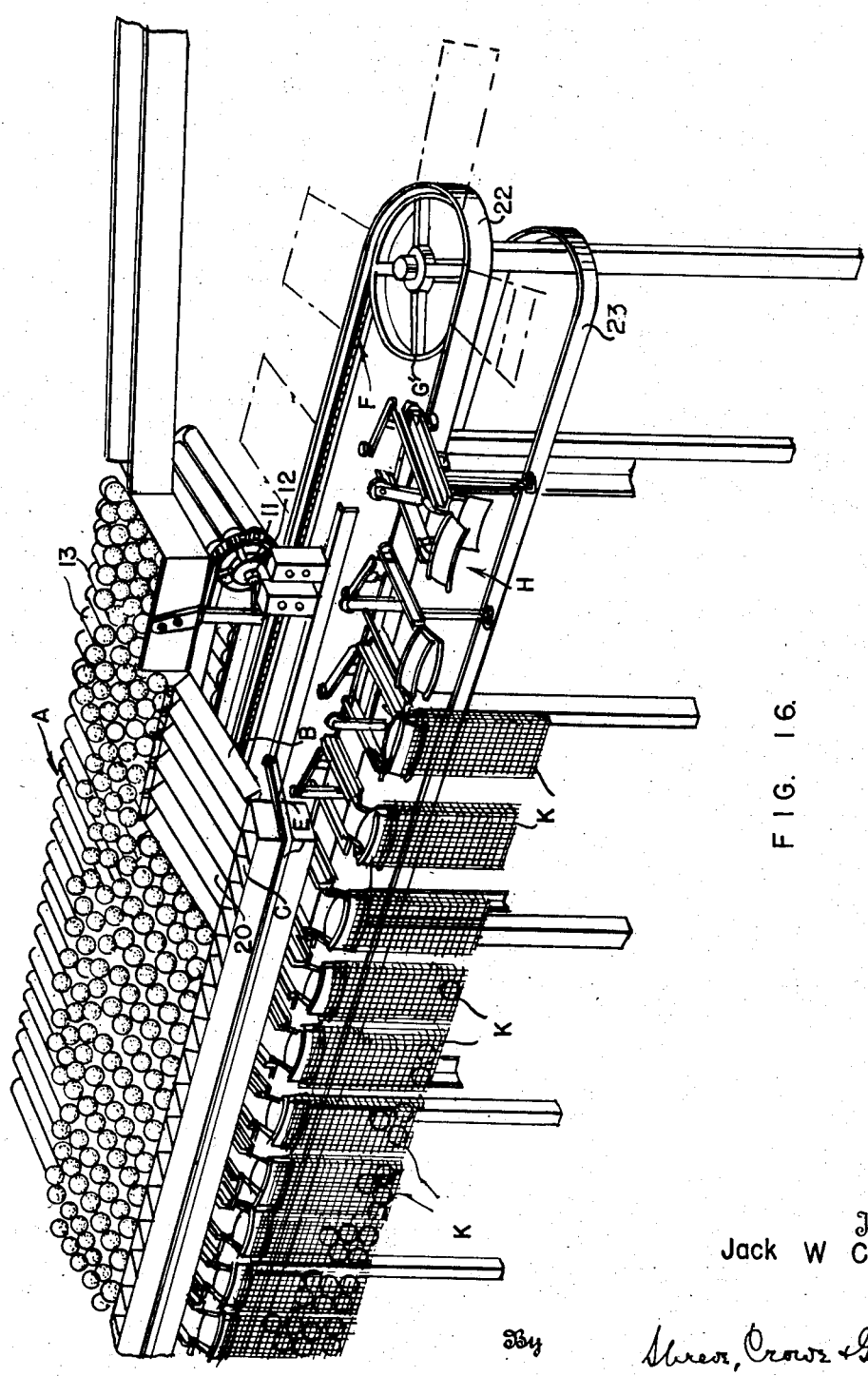
Fig. 16 is a perspective view of the portion of the machine shown in Figs. 1 and 3.

The machine of the present construction comprises three units which may be referred to as (one) the distributor and feeding mechanism, (two) the bag holders, carriage and track mechanism or assembly, and (three) the filled bag closure and delivery unit.

Generally speaking, the distributor unit consists of rolls mounted on two endless chains to form a conveyor. Two wooden strips under the rolls, one near each end, support the weight of the rolls and cause them to rotate as they are pulled along by the chains. The material composing the rolls, and the dimensions of the said rolls are not critical and depend upon the particular size and the capacity of the installaion. The weight of the return, or lower side of the distributor, is carried directly by the chains, which slide in steel angles which form a part of the frame.

The entire distributor assembly is sloped sideways toward the front of the machine at an angle somewhat greater than the angle of repose of the fruit being handled, for example, an angle of approximately six degrees to the horizontal. This angle of slope however is not critical, but should be sufficient to maintain the fruit gravitationally rotating constantly by the rotation of the rolls during their travel in distributing direction and maintain the fruit crowding down to the front side of the machine to discharge chutes which direct the fruit to the bags. The counting is done by lifting one piece of fruit from each chute in succession as the bag carrier moves along under the chutes, the number of which correspond to the number of objects desired to be contained in the bag. The chutes which are not being used are closed by a bar or other suitable closure means disposed across the upper ends of the chutes. It will be apparent that the number of chutes can be varied to suit conditions in accordance with the desired capacity of the machine.

Preferably the chutes are formed of triangular shaped wooden strips, in the present instance, two and three-fourths inches wide by one and one-fourth inches thick, arranged parallel on four inch centers. Elevating ejector rods or levers are pivoted at their upper ends on a rod which runs the length of the chute assembly. Ejector cam arms are connected to the ejector rods by rods with ball and socket end connections for engagement by cam arms passing thereunder.

Fruit on the distributor in excess of that amount required to fill the chute spills over at the end into an inclined trough and rolls to an elevator to be carried up again to the entering end of the distributor for recirculation by suitable means mounted along the rear side of the machine (not shown).

The bag holders, carriage and track assembly, includes a plurality of bag holders. Each bag holder includes a mouthpiece constructed of two similar halves, constituting the jaws, pivotally mounted so that they can swing together to form a smooth solid approximately elliptical shape to facilitate putting on the empty bags at a high rate of speed. Also the jaws of each bag holder swing up toward an operator while they are closing, so that the bags may be mounted on the holder with a minimum of effort by the operator. When the jaws of each holder are allowed to open after the bag is placed on the holder a spring at each end holds the jaws apart and keeps them expanded in the mouth of the bag. A raised lip or bead around the lower edge of each mouthpiece or jaw projects into the open mesh portion of the bag fabric just below the closely woven selvage top, and prevents the bag from slipping down under the weight of the fruit.

When the bag is on the mouthpiece the jaws are spread apart by the action of the tension springs and stand approximately vertical, forming a guide for the fruit dropping into the bag as well as gripping the mouth of the bag due to the projecting bead around their lower edges. The mouthpiece is automatically adjustable to hold bags of different circumferences, for example, eight pound and ten pound bags. Collapsing the mouthpiece jaws to receive an empty bag is accomplished as follows:

As each bag holder carriage continues its travel a cam formed on the forward portion of a cam track member, the latter extending the length of the chute assembly, engages a cam lever arm on the carriage, and through a connecting link causes the rear half of the mouthpiece to rotate around its pivot, which is common to both halves, the front half being connected to the rear through said springs, and also rotates around said common pivot until it strikes the stop, which stop is fixed to the frame of the carriage. The rotation of the rear half of the holder continues after the front half has been stopped, until the mouthpiece halves or jaws are brought together or collapsed, the springs then being extended, and during the interval of engagement of said lower arm with said cam an empty bag is placed on the holder, and passage of the lever from the cam releases the main half, allowing the springs to expand the jaws in the bag and hold them there under tension, and at the same time causing the mouthpiece to continue to move back and downwardly to a vertical expanded position to receive the fruit.

A lever arm carrying two cam rollers, one mounted to rotate in a vertical plane and the other in a horizontal plane, is connected to the front jaw by a link, and when said empty bag is in place with the two jaws standing approximately vertical as previously described, said lever also stands vertically, and as the respective carriages move along the feed chutes the cam arms connected to the fruit elevating ejector lifters are engaged by the vertical cam roller and raised in succession to lift and eject one piece of fruit from each chute. When there is no bag on a holder, the front jaw is pulled forwardly to a relaxed position by the springs, causing the lifting or ejecting cam lever to swing to the rear. In this position, as the carriage moves along the track under the feed chutes, the cam lever passes behind the ejector cam arms and no fruit is discharged.

At the end of the chute assembly where the filled bags are released to the conveyor of the bag closure unit, there are two cams which act simultaneously on the cam arms of the bag holder carriages previously described. One cam is formed on or affixed to the rear end portion of a short cam track extending parallel to said first mentioned cam track, and the other formed on or affixed to the rear end portion of said first mentioned track. The short track cam operating on the horizontally mounted roller on the cam lever arm that engages the fruit ejector cam arms causing the front jaw to be held, through the connecting link against the pull of the jaw springs. At the same time, the rear cam on the first mentioned cam track causes the rear jaw to move forwardly and collapse against the front jaw and release the top of the filled bag. The jaws are held in such collapsed position and rotated upward and outward to lift out of the bag's mouth. This action is the reverse of the action at the empty bag loading station, with the exception that the additional cam action of the horizontal roller of the lever connected to the front jaw is necessary.

Limit switches of a sensitive type, actuated by small feeler wires or levers, may be applied to the last two or three chutes in the line in order to have means of stopping the bag carriers if an insufficient supply of fruit is coming on the distributor. This, is an optional provision, and is not a required part of the equipment.

The filled bag closure and delivery unit closes the filled bags by sewing. The bags when filled are delivered to the sewing machine, the sewing head of which is mounted on a bracket which can be raised or lowered by a screw on the supporting column to adjust the height of the seam with relation to the top of the bag. Fixed to the same bracket which carries the sewing head are arms which carry small endless chains or belts which come together at the center lines of the conveyors and pass through the sewing head just above the needle and which structure is adjustable as a unit with said bracket. The purpose of these chains, belts or the like, is to hold the mouth of the bag in a closed position in a straight line for delivery to the feed dogs of the sewing head. An operator may be stationed at the point of entry of the bag mouth into these gripper chains or belts, to insert the bag mouth into them in the correct position and alignment should it become necessary.

The lower part of the bag, and the weight of fruit or other contents, are supported by three endless conveyors, the horizontal or bottom one of which include endless chains on which are mounted slats or the like of suitable material. The two vertical conveyors adapted to grip the opposite sides of the filled bags have mounted on their respective upper and lower chains, an endless series of rectangular hollow box-like elements in which are detachably mounted and suitably secured resilient filled bag engaging members of sponge rubber or the like of a length substantially that of said bags, so as to afford an uninterrupted grip throughout the length of resilient members and the major portion of the bag to firmly support the fruit contents of the bag without bruising or damage thereto. All three conveyors together with the two small belts or chains which hold the bag mouth, are driven at the same speed by means of shafts at the discharge ends, which are geared together. The chain of sewing thread between the bags is cut by a spring mounted knife mechanism automatically controlled by each bag as it passes from the sewing head.

The machine is driven by an electric motor preferably mounted beneath the rear end of the distributor conveyor mechanism and adjacent the filled bag closure and delivery unit. Said motor is adapted to drive a motor shaft extending rearwardly to the end of said bag closure unit to a gear box from which motive power is supplied to the rear shaft of the bottom filled bag conveyor and through gear connections to the rear vertical shafts of the adjacent vertical conveyors, these vertical shafts also driving the bag mouth engaging chains or belts. A pulley mounted on said motor shaft is adapted to drive the sewing head through a suitably operable friction clutch by means of a belt.

A shaft extending from the opposite side of said motor has driving connections with a gear box having driving connections with the shaft of the drive sprocket for the conveyor chain attached to the bag holder carriages. Said shaft also has driving connection with a drive pulley or sprocket mounted on the rear shaft of the distributor roller conveyor adapted to initially receive the fruit for distribution and packaging.

As has been pointed out above, the mechanism of the present invention embraces three main units, or divisions, which are intended to be used in various combinations, either with themselves, or with other mechanisms or devices, for packaging objects such as oranges or other citrus fruits, or similar articles, into bags or other similar containers made of flexible materials.

Having thus briefly described the three units constituting the complete machine, the third, or, bag closing and delivery unit, forming the subject matter of the instant application, will now be described in detail.

In the illustrated embodiment characterizing this invention there is shown (Figs. 1 to 4) a citrus fruit or other spherical-article packaging machine, comprising a conveyor A which is adapted to receive the fruit X to be packaged, said conveyor delivering the fruit to a plurality of feeding chutes B, each chute being provided with a single fruit-ejecting mechanism C adapted to eject the lowermost fruit or article held by said chute into a respective hopper chute D, a plurality of which are mounted adjacent the ends of chutes B.

The conveyor A comprises a pair of endless chains 10 mounted on pairs of sprockets 11 mounted on shafts 12, said chains being connected by a series of rollers 13 rotatably connected to said chains, and adapted to be rotated by the underlying supporting members 14 during their distributing travel. One of said shafts 12 has mounted thereon gear wheel 15 adapted to mesh with pinion 16 mounted on drive shaft 17 on the opposite end of which is a sprocket or pulley 18 for driving said endless conveyor as will directly more fully appear. Said conveyor being mounted at an incline toward the chutes B for gravitationally delivering the fruit to said chutes. The chutes B being mounted at an angle to a horizontal plane and comprises the V-shaped feeding chutes 19 defined by the triangular strips 20, said chutes being closed at their lower ends by an end member 21 so that as the fruit is delivered from the conveyor A it is aligned in columns in said chutes. Said conveyor, feeding chutes, and hopper chutes D are suitably mounted on frame members E arranged and suitably connected to form the frame structure.

Underlying the conveyor A and the chutes B and suitably mounted on said frame members is an endless conveyor F mounted at one end on a drive sprocket G, and at the opposite end on an idler sprocket G', and mounted on said frame is an upper endless track 22 and a lower endless track 23, and mounted on said upper track is a plurality of bag-holding carriage members H on which are mounted bag-holding jaw elements 24. Mounted on the carriage is a jaw actuating mechanism including a roller arm 25 for effecting collapsing and expanding of said bag-holding jaws for receiving and holding bags K, and also mounted on said carriage is a cam arm 26 carrying roller 27 adapted to effect operation of the vertically operable fruit ejector mechanism C to eject the lowermost fruit from the respective chutes 19 as each bag-carrying carriage passes thereunder in succession.

Each of the series of carriages H is connected to the endless conveyor F. The drive sprocket G is mounted on the drive shaft 28, which is suitably driven as will hereinafter more fully appear. The number of chutes 19 corresponds to the number of fruit or articles to be contained in the bags, so that when a bag has traversed the battery of chutes it will contain the predetermined number, and as it passes from the final chute the jaws are collapsed and withdrawn from the bag and the filled bags are delivered to the bag closing and delivery unit L.

The subject matter comprehended by the distributing and feeding mechanism is more specifically described and claimed in my co-pending application Serial No. 765,135, filed July 31, 1947, and the subject matter of the bag holders, carriage and track assembly, is more specifically described and claimed in my co-pending application, Serial No. 765,136, filed July 31, 1947.

The unit L comprises bottom substantially parallel spaced base members 29 and 30, to which are attached upright angle iron standards 31 and 32 to which standards are attached a cross-channel member 33. This channel member 33 carries longitudinally extending arms 34 and 35, these arms 34 and 35 being positioned along the upper portion of the unit L. Bracket arms 36 and 37 constituting continuations of arms 34 and 35 extend inwardly from said arms 34 and 35, pulley wheels 38 and 39 being mounted on the end of these bracket arms 36 and 37. An angle bracket 40 also is mounted on arm 34 and mounts a pulley wheel 41. Cross-channel member 33 carries pulley wheels 42 and 43 on angle brackets 44 and 45, respectively. Endless chain guides 46 pass around these pulley wheels, and are actuated by driving pulleys 47 and 48 on the vertical shafts 49 and 50. These guide chains 46 are adapted to guide the open mouths of the filled bags to be closed to the sewing machine structure represented generally at 51, which is adapted to stitch the filled bags along the upper edge thereof to close the said bags.

Said unit L comprises further a plurality of co-operating conveyors, there being provided a bottom conveyor 52 having conveyor treads 53 thereon, the conveyor 52 being composed of flexible chains 52' and 53' with the treads 53 spanning the chains and spaced from one another for enabling the conveyor to pass around end rollers or spools 54 and 55 that are mounted on shafts 56 and 57 that operate in bearings such as shown at 58 and 59, these bearings being mounted on the bottom frames 29 and 30. Mounted in bearings 60 and on the bottom frame elements 29 and 30 are corresponding vertical shafts 61 and 62, it being understood that these bearings are duplicated on each side of the unit. Shafts 49 and 61 carry end rollers or spools 63 and 64 for receiving the vertically disposed side conveyor 65. Mounted in similar fashion is a second vertical conveyor 66 which passes around end rollers or spools 67 and 68 mounted on shafts 50 and 62, the upper ends of which shafts 49 and 50 operate in bearings 69 mounted on channel frame member 33 and shafts 61 and 62 in bearings 70 on arm members 71 mounted on and welded or otherwise secured to the vertical beams 72 supported on and secured to members 29 and 30 by angle plates 73 and bolts 74.

A feature of these laterally disposed conveyors 65 and 66 lies in the fact that each of their component elements 75 comprises a box-like element 76, having oppositely disposed sides 77 and 78 and in-turned ends 79 and 80, each of these conveyor elements 75 thereby forming a box-like receptacle for receiving and holding a resilient bag-gripping element 81 which is formed of sponge-rubber 82 or the like, having a flexible protective covering of a suitable fabric 83, and which are adapted to engage the opposite sides of the filled bags carried by the bottom conveyor 52, said elements being maintained in a straight line and in gripping engagement with the filled bags by the conveyor supporting backing members 84 which prevent disalignment by pressing engagement with the filled bags.

The action of these soft rubber facing elements is to grip each of the bags and to hold the citrus fruit or other articles therein against displacement as the bags move toward the sewing head. The coaction of these resilient facing elements 81 not only prevents injury to the fruit in the bags, but also prevents shifting thereof so that the bags are positively gripped between the side conveyors and the open mouths thereof are moved in upright position between the courses of the guide chains or cables 46, thereby being assured of reaching the stitching head 51 in proper position for receiving a stitching needle or the like (not shown), which receives thread or other sewing medium from spools 85, mounted on the sewing head 51. The needle operates horizontally so as to close the bags along the line of a seam 86 (Fig. 11) adjacent to the top of the bag and extending entirely across the bag.

Sewing head 51 is suitably mounted on the bracket or cross-head supporting structure 87 connected by bars 88 to a supporting head 89 mounted on a vertical standard 90, and adjustable vertically thereon by hand wheel 91 for positioning the sewing head relative to the bags, and at the same time, effecting similar adjustment of arms 34 and 35 and the bag mouth gripping and guiding chains or belts 46 carried thereby. Since the sewing head 51 is connected to arm 35, as at 92, which in turn is mounted on cross-channel member 33, provision must be made for enabling vertical movement of the arms 34 and 35 corresponding to the movement of the sewing head 51. For this purpose the upright angle frame members 31 and 32 have bolted thereon adjacent their upper ends a slide plate 93 that is provided with a slot 94. The channel member 33 is mounted on the slide plate by welding or the like as indicated at 95. The vertical angle bars 31 and 32 are provided with holes 96 for insertion of bolts 97 that are held in place by washers 98 and nuts 99, loosening of the nuts permitting the plates 93 to slide relatively to the frame members 31 and 32 to permit adjustment of the arms 34 and 35 along with the sewing head.

The vertical conveyors 65 and 66 are driven from shaft 56 through a series of beveled gears 100 and 101 on shaft 56. Beveled gear 100 meshes with the beveled gear 102 on the lower end of shaft 50, the shaft 50 operating in bearing 103 mounted on bracket 104 supported on cross-beam 104', and bearing 69 mounted on beam 33. Shaft 49 is driven by the intermeshing of beveled gear 101 on shaft 56 with beveled gear 105 on the lower end of vertical shaft 49. Said shaft 49 operates in bearing 106 on bracket 107 and bearing 69 mounted on beam 33.

An important feature of this unit L is the provision of the resilient bag-gripping members 81, the provision of this resilient member assuring the proper conveyance of the filled bags to the sewing head as explained above. They are held in position in their conveyor receptacles by pins or the like 108 passing through suitable holes 109 provided therefor in sides 77 and 78. The bag-engaging or gripping members 81 are substantially softer than the fruit or other articles in the bag and conform to irregularities presented thereby, thus preventing shifting of the contents of the bags while being conveyed, said members 81 being held firmly against twisting or shifting by the sides 77 and 78 of the conveyor receptacle members, and against longitudinal movement by the engaging ends 79 and 80.

The bags are indicated at K (Figs. 11 and 12), which latter show details of means provided for cutting the thread after the bag has been closed by the sewing unit. As the mouth ends of the bags K pass through the sewing head 51 they are sewed along a seam indicated at 86, see Fig. 11. Mounted on a bracket 110 suitably secured to the sewing head 51 is a coil-spring 111, one end of which carries the cutting device 112 having a cutting edge 113 and carrying a curved actuating handle 114. As each bag passes from the stitching head 51 it engages the handle 114 moving the cutter and handle 112 to dotted line position against the tension of the spring 111. As the bag moves out of engagement with the handle 114, the spring 111 snaps the cutting edge 113 across the chain of thread 115 interconnecting the sewed bags, thereby cutting said thread and releasing the now closed bag. As will be noted from Fig. 6 the machine may be supported on any type of foundation or base beam structure as indicated at 116, upon which the longitudinal frame-beams 29 and 30 are shown as resting.

The driving arrangement with respect to the three coacting units of the machine from a source of power is diagrammatically illustrated in Fig. 15. In the present instance, the source of power is an electric motor 117, and is mounted beneath the rear end of the distributor mechanism A and adjacent the filled bag closure and delivery unit L. The drive from said motor is through a motor shaft 118, which extends rearwardly to a gear box 119 adjacent the end of the bag closure unit L, and therefrom through shaft 120, pulley 121 mounted thereon, belt 122, pulley 123 mounted on drive shaft 56 driving the bottom conveyor 52, and through gear connections between shaft 56 and shafts 49 and 50 driving the vertical conveyors 65 and 66, and through the vertically adjustable drive sprockets 47 and 48, driving the gripping chains or belts 46. Mounted on shaft 118 is a pulley 124 which drives sewing machine 51 by belts 125 and 125' through a suitably mounted pulley and clutch mechanism 125'', which may be manually or otherwise operated as desired. It is obvious that during vertical adjustment of the sewing machine 51, suitable compensatory adjustment is to be made in the lengths of the belt drives 125, 125' between the sewing machine 51 and the driving motor 117. A second motor shaft 126 extending in a direction opposite to shaft 118 has mounted thereon pulley or sprocket 127 connected by a belt or chain 128 with pulley 129 mounted on shaft 130 connected with gear box 131, and connected with said gear box is shaft 28 of sprocket G which drives conveyor chain F to which are attached the bag-holder carriage mechanisms H. The free end of said motor shaft 126 is connected with gear box 132, and having connection therein with shaft 133 on which is mounted a pulley or sprocket 134, and by belt or chain 135 with pulley or sprocket 18 mounted on drive shaft 17 and pinion 16 meshing with gear wheel 15 on shaft 12 of distributor roller conveyor A for driving the latter. Also, it will be noted that the present gear box arrangement enables the operating speeds of each of the three main cooperating units of the machine to be varied, or all or certain of them, to be synchronized as desired.

It will be apparent from the foregoing that the machine of the present invention provides a simple unit for receiving the filled bags from the filling unit, and conveying them in vertical position, in cooperation with the guide cables, belts or the like 46, which engage the bags adjacent to their open mouths, which they direct in a closed straight line to and through the sewing means, which stitches closed said open end of the bag as each bag is delivered thereto. The bags thus closed are conveyed by the bottom conveyor 52 and side conveyors 65 and 66 past the cutting instrumentality 112 and the seam 86 portion engages handle 114 depressing it and cutter 112 against the tension of spring 111, and as the handle is disengaged from said bag cutter 112 is impelled at a slight angle opposite to the direction of travel of the thread across the thread 115 severing it, and the bags in succession are discharged from the unit for whatever distribution the filled bags are desired. It will be apparent that the conveyors 52, 65 and 66 operate at the same speeds, and, as has been pointed out above, the soft resilient bag-gripping members 81 of conveyors 65 and 66, throughout the length of said members, firmly grip and support the filled bags on opposite sides as the bags travel to and past the stitching head without damage to the contents of the bags while, enabling the conveyors to grip the bags firmly on opposite sides by conforming to the irregularities presented by the fruit, and at the same time preventing the material shifting of such contents of the bags, and because of the softness of bag-gripping members the fruit contained in the bags is not bruised or otherwise damaged during passage through the bag-closing unit.

While the construction and operation of the present invention has been designed primarily for closing automatically open ends of fabric bags containing oranges or other citrus fruit, it will be evident that the operation of the machine is not dependent upon any particular contents of the bags, it being customary to place a predetermined number or weight of oranges or other citrus fruits or other spherical objects in such bags for market, the resulting packages meeting with wide favor by the consuming public because they are of known weight or number of fruit which is indicated on the bag and the contents of the bag are readily visible to the purchaser.

While the accompanying drawings illustrate a preferred embodiment of the mechanism of the present invention, it will be apparent that the details of construction may be varied within rather wide limits without departing from the spirit of the invention, and, therefore, it will be understood that it is intended and desired to embrace within the scope of the invention such modifications and changes as may be necessary to adapt it to varying conditions and uses, as defined by the appended claims.

Having thus described my invention, what I desire protected by Letters Patent is as set forth in the following claims:

1. Apparatus for closing fabric bags filled with citrus fruit or similar spherical articles and for conveying the filled fabric bags from a filling station to a bag closing station, which comprises, in combination, a machine frame, a horizontally disposed bottom conveyor mounted on the frame, oppositely disposed spaced parallel lateral conveyors carried by the frame and vertically disposed relative to the bottom conveyor, driving means for driving the said horizontal bottom conveyor and the lateral conveyors at the same speed, the bottom conveyor being adapted to receive filled bags from bag-filling instrumentalities and to convey the same in substantially upright position between the said lateral conveyors, the said lateral conveyors being adapted to oppositely engage the bags and to convey them in upright position along the conveyor, the said lateral conveyors including a plurality of vertical resilient bag-gripping elements comprising sponge rubber pads mounted on and extending crossways at right angles to the horizontal movement of the lateral conveyors, and means flexibly interconnecting the said elements together, the said bag-gripping elements being normally spaced from, and out of contact with each other throughout their horizontal travel on the lateral conveyors, and adapted to continuously support the bags and contents longitudinally thereof through central portions of the bags and contents.

2. In apparatus for closing fabric bags filled with citrus fruit or other spherical objects for conveying the said citrus fruit-filled bags from a bag-filling station to a bag-closing station, and including a horizontally disposed bottom conveyor and a pair of horizontally moving oppositely disposed lateral conveyors adapted to vertically engage between them the filled bags on opposite sides of the bags, the improvements which comprise oppositely disposed vertically extending resilient bag-gripping elements mounted on the lateral conveyors, the said elements including sponge rubber pads mounted on and extending crossways of and at right angles to the horizontal movement of the lateral conveyors, and means engageable with the bag-gripping elements throughout the length of the lateral conveyors for maintaining said conveyors in alignment and said elements in gripping engagement with the filled bags during the conveying operation.

3. In apparatus for closing fabric bags filled with citrus fruit or other spherical objects for conveying the said citrus fruit filled bags in vertical position from a bag-filling station to a bag-closing station, and including a horizontally disposed bottom conveyor and a pair of horizontally moving oppositely disposed lateral conveyors adapted to vertically engage between them the filled bags on opposite sides of the bags, the improvements which comprise oppositely disposed, vertically extending resilient bag-gripping elements mounted on the lateral conveyors, the said elements including sponge rubber pads mounted on and extending crossways of and at right angles to the horizontal movement of the lateral conveyors, the said bag-gripping pads being normally spaced from, and out of contact with each other throughout their horizontal travel on the lateral conveyors, and vertically gripping the said bags and contents while conforming to irregularities presented by the articles in the bags, thereby producing uniform engagement of the sponge rubber pads with the bags and contents over a substantial area crossways of the conveyor irrespective of the spherical nature of the contents of the bags, and means engageable with the bag-gripping elements throughout the length of the lateral conveyors for maintaining said conveyors in alignment and said elements in gripping engagement with the filled bags during the conveying operation.

4. A citrus fruit or the like filled fabric mesh bag closing and delivering unit comprising a plurality of cooperating endless conveyors, said conveyors including a bottom platform conveyor having transverse horizontally disposed equi-spaced tread members for supporting said filled bags and a pair of laterally spaced vertically disposed conveyors above and adapted to travel in unison with said bottom conveyor, each of said vertical conveyors comprising an endless series of flexibly connected spaced vertically disposed pad-receiving holders, a pad element yieldable to the pressure of the fruit contents of the bag detachably mounted in each of said holders, the pads of said vertical conveyors adapted to supportingly grip throughout their length the opposite sides of said filled bags longitudinally thereof during their delivering travel, means for maintaining said vertical conveyors throughout their length in uniform parallelism during the bag-gripping and delivering operation, and means for closing said filled bags as they are delivered from said unit.

5. A citrus fruit or the like filled fabric mesh bag closing and delivering unit comprising a plurality of cooperating endless conveyors, said conveyors including a horizontal bottom conveyor for supporting said filled bags and a pair of laterally spaced vertically disposed conveyors above and adapted to travel in unison with said bottom conveyor, each of said vertical conveyors comprising an endless series of flexibly connected spaced vertically disposed pad-receiving rigid holders, a pad-like element yieldable to the pressure of the fruit contents of the bag mounted in each of said holders, means carried by each holder for detachably securing the pad therein and preventing twisting thereof, said pads adapted to supportingly grip throughout their length the central portions of opposite sides of said filled bags intermediate their ends and longitudinally thereof to prevent bulging of the bags and any substantial shifting of the bag contents during the delivering operation, means engageable with said holders throughout the length of said vertical conveyors for maintaining said conveyors in alignment and said pads in gripping engagement with the filled bags during the conveying operation, and means for closing said filled bags.

6. A citrus fruit or the like filled mesh bag closing and delivering unit comprising a plurality of cooperating endless conveyors, said conveyors including a horizontal bottom platform conveyor for supporting said filled bags and a pair of laterally spaced vertically disposed conveyors above and adapted to travel in unison with said bottom conveyor, each of said vertical conveyors comprising an endless series of flexibly connected spaced vertically disposed pad-receiving rigid holders, a pad-like element yieldable to the pressure of the fruit contents of the bag mounted in each of said holders, means carried by each holder for detachably securing the pad therein and preventing twisting thereof, said pads adapted to supportingly grip throughout their length the major portions of opposite sides of said filled bags intermediate their ends and longitudinally thereof to prevent bulging of the bags and any substantial shifting of the bag contents during the delivering operation, backing members for said conveyors engageable with said holders for maintaining the conveyors in alignment and said pads in gripping engagement with the filled bags during the conveying operation.

7. A citrus fruit or similar spherical article filled fabric bag closing and delivering unit comprising a plurality of cooperating endless conveyors, said conveyors including a bottom horizontally disposed conveyor for supporting said filled bags and a pair of laterally spaced vertically disposed conveyors above and adapted to travel in unison with the bottom conveyor, each of said vertical conveyors comprising an endless series of spaced flexibly connected vertically disposed flat bottom holders, a pad-like element mounted in each of said holders yieldable to the pressure of the spherical contents of the bag, said pad adapted to supportingly grip throughout its length the central portion of the opposite sides of the filled bag longitudinally thereof to prevent bulging of the bag and any material shifting of the bag contents during the delivering operation, means in connection with each of the holders for confiningly supporting the surrounding portion of the pad adjacent to said flat bottom, and means engageable with said confining means for detachably securing said pad and preventing twisting thereof when subjected to gripping pressure with the filled bag, backing members for said conveyors engageable with the flat bottoms of said holders for maintaining said conveyors in alignment and said pads in gripping engagement with the filled bags during the delivering and bag closing operations, and means for closing said filled bags.

8. A citrus fruit or similar spherical article filled fabric bag closing and delivering unit comprising a bottom horizontal conveyor for supporting said filled bags, and a pair of laterally spaced vertically disposed conveyors adapted to travel in unison with said bottom conveyor, each of said vertical conveyors comprising an endless series of flexibly connected spaced vertically disposed pad-receiving holders, a pad-like element yieldable to the pressure of the spherical contents of the bag seatingly mounted in each of said holders, means carried by said holder and coacting with the pad to maintain said pad in seating engagement therein and preventing twisting thereof when in gripping engagement with the bag and contents, backing means coextensive with the length of said vertical conveyors for maintaining the same in alignment and adapted to force the yieldable pads into longitudinal pressure engagement with the opposite sides of the filled bags causing portions of the spherical contents to assume positions in the ends of the bags and the gripped and end portions being maintained in non-shifting positions throughout the delivering operation.

JACK W. CARTER.

References Cited in the file of this patent

UNITED STATES PATENTS

| Number | Name | Date |
|---|---|---|
| Re. 14,443 | Seymour | Mar. 5, 1918 |
| 607,810 | Timewell | July 19, 1898 |
| 1,525,732 | Harding | Feb. 10, 1925 |
| 2,037,200 | Rosmait | Apr. 14, 1936 |
| 2,054,279 | Briggs | Sept. 15, 1936 |
| 2,109,407 | Westin | Feb. 22, 1938 |
| 2,160,059 | Cundall | May 30, 1939 |
| 2,277,783 | Scharf | Mar. 31, 1942 |
| 2,282,200 | Neuman | May 5, 1942 |
| 2,297,296 | Flintjer | Sept. 29, 1942 |